(12) United States Patent
Fournier et al.

(10) Patent No.: US 8,297,637 B2
(45) Date of Patent: Oct. 30, 2012

(54) WATERCRAFT TRAILER

(75) Inventors: Eric Fournier, Orford (CA); Joey Larouche, Mont-Saint-Hilaire (CA); Daniel Mercier, Magog (CA); Bruno Girouard, Shefford (CA); Hugo Brisson, Valcourt (CA); Christian Labbe, Saint-Denis-de-Brompton (CA)

(73) Assignee: Bombardier Recreational Products Inc., Valcourt (CA)

( * ) Notice: Subject to any disclaimer, the term of this patent is extended or adjusted under 35 U.S.C. 154(b) by 178 days.

(21) Appl. No.: 12/672,130

(22) PCT Filed: Apr. 30, 2008

(86) PCT No.: PCT/US2008/062024
§ 371 (c)(1),
(2), (4) Date: Feb. 4, 2010

(87) PCT Pub. No.: WO2009/134252
PCT Pub. Date: Nov. 5, 2009

(65) Prior Publication Data
US 2011/0181017 A1    Jul. 28, 2011

(51) Int. Cl.
*B60P 3/10* (2006.01)

(52) U.S. Cl. ................. 280/414.1; 280/414.3

(58) Field of Classification Search ............... 280/414.1, 280/414.2, 414.3, 47.331
See application file for complete search history.

(56) References Cited

U.S. PATENT DOCUMENTS

| | | | | |
|---|---|---|---|---|
| 3,365,733 A * | 1/1968 | Gudmundson | ............... | 114/344 |
| D292,785 S * | 11/1987 | Warren | ............... | D12/101 |
| 4,895,387 A * | 1/1990 | Hawkins et al. | ............ | 280/414.1 |
| 4,943,076 A * | 7/1990 | Tripke | ............... | 280/166 |
| 5,228,713 A * | 7/1993 | Kovach | ............... | 280/414.1 |
| D371,336 S * | 7/1996 | Wilson | ............... | D12/203 |
| 5,899,656 A | 5/1999 | Rahe et al. | | |
| 7,574,764 B1 * | 8/2009 | Irving | ............... | 14/69.5 |
| 7,753,389 B1 * | 7/2010 | Koball | ............... | 280/414.1 |
| 7,810,830 B2 * | 10/2010 | Warren | ............... | 280/414.1 |
| 8,152,193 B2 * | 4/2012 | Brisson et al. | ............ | 280/414.1 |
| 2007/0187924 A1 * | 8/2007 | Warren | ............... | 280/414.1 |

OTHER PUBLICATIONS

International Search Report from PCT/US2008/062024 dated Apr. 23, 2009.

* cited by examiner

*Primary Examiner* — Tashiana Adams
(74) *Attorney, Agent, or Firm* — BCF LLP

(57) ABSTRACT

A watercraft trailer has a watercraft receiving portion and a lower frame adapted to support a watercraft in the watercraft receiving portion. The lower frame has at least one longitudinally extending lower frame member. The trailer also has a hitch coupler connected to a front of the lower frame, a first wheel and a second wheel operatively connected to the lower frame, and a walk board connected to the lower frame.

33 Claims, 13 Drawing Sheets

WATERCRAFT TRAILER

FIELD OF THE INVENTION

The present invention relates to trailers used to transport watercraft.

BACKGROUND OF THE INVENTION

In order to transport a watercraft from one body of water to another, or between a body of water and a storage location, trailers that can be hitched to a motorized wheeled vehicle are often used. Typically, the trailer is backed down a ramp (either man-made or natural) at least partially into the water. The watercraft is then driven onto the trailer such that the watercraft sits on support structures of the trailer. Finally, the trailer and watercraft are pulled out of the water using the motorized vehicle.

In most such trailers, the watercraft is guided and aligned onto the trailer by the support structures which are adapted to engage the hull of the watercraft. These structures can consist of one or more beams or rollers.

One of the inconveniences with such an arrangement is that if the trailer is not low enough in the water, the watercraft will rest on the support structures before being fully on the trailer. On the other hand, if the trailer is too low in the water, the watercraft will float above the support structures which will therefore not provide any guidance for the watercraft.

Once the watercraft is supported on the trailer, to get off the watercraft the driver and passengers (if applicable) of the watercraft need to make their way to the front of the watercraft before stepping down therefrom so as to be in shallow water or on land. However, depending on the type of watercraft, this is not always possible. For example, in the case of personal watercraft, the forward end of the watercraft provides no area where someone could safely step. Therefore, in such watercraft, the driver and passengers (if applicable) need to get off the side of the watercraft where the water level is relatively high, which is inconvenient. The alternative is to wait until the trailer and watercraft are pulled out of the water, which can also be inconvenient.

Therefore, there is a need for a watercraft trailer having features for guiding a watercraft onto the trailer.

There is also a need for a watercraft trailer which facilitates getting on and off a watercraft once the watercraft is supported by the trailer.

SUMMARY OF THE INVENTION

It is an object of the present invention to ameliorate at least some of the inconveniences present in the prior art.

It is also an object of the present invention to provide a watercraft trailer having a walk board for the driver and passengers (if applicable) of a watercraft to step on when the watercraft is supported on the trailer. The walk board facilitates getting off the watercraft and then getting off the trailer. The walk board also facilitates getting on the trailer and then on the watercraft.

In one embodiment, the walk board is angled relative to a lower frame of the trailer such that when the trailer is backed down a ramp, the walk board is generally horizontal.

In another embodiment, a step is provided forwardly and downwardly of the walk board such that the driver and passengers (if applicable) can step down from the walk board to the step, and the from the step to the ground, and vice versa.

In one embodiment, more than one walk board is provided. The walk boards are disposed above the lower frame such that they can contact the sides of a watercraft being driven onto the trailer so as to guide it into position. Since the walk boards are elevated in order to contact the sides of the watercraft, the position of the trailer in the water becomes less of an issue compared to prior art trailers.

In one aspect, the invention provides a watercraft trailer having a watercraft receiving portion and a lower frame adapted to support a watercraft in the watercraft receiving portion. The lower frame has at least one longitudinally extending lower frame member. The trailer also has a hitch coupler connected to a front of the lower frame, a first wheel and a second wheel operatively connected to the lower frame, and a first walk board connected to the lower frame. The first walk board is disposed on a first side the watercraft receiving portion. The first walk board is disposed in a longitudinal direction relative to the at least one longitudinally extending lower frame member such that a distance between the first walk board and the at least one longitudinally extending lower frame member is shorter at a front of the first walk board than at a rear of the first walk board. The first walk board defines a generally horizontal upper surface in a lateral direction.

In an additional aspect, an angle between a line extending from the front of the first walk board to the rear of the first walk board and the at least one longitudinally extending lower frame member is between 5 and 25 degrees.

In a further aspect, a second walk board is connected to the lower frame. The second walk board is disposed on a second side of the watercraft receiving portion. The second walk board is disposed in the longitudinal direction relative to the at least one longitudinally extending lower frame member such that a distance between the second walk board and the at least one longitudinally extending lower frame member is shorter at a front of the second walk board than at a rear of the second walk board. The second walk board defines a generally horizontal upper surface in the lateral direction.

In an additional aspect, a first angle between a line extending from the front of the first walk board to the rear of the first walk board and the at least one longitudinally extending lower frame member is between 5 and 25 degrees. A second angle between the a line extending from the front of the second walk board to the rear of the second walk board and the at least one longitudinally extending lower frame member is between 5 and 25 degrees. The first angle is equal to the second angle.

In a further aspect, a lateral distance between the first and second walk boards is at least 100 cm.

In an additional aspect, an upper frame is connected to the lower frame. The first and second walk boards are supported by the upper frame.

In a further aspect, a third generally U-shaped walk board is disposed forwardly of the first and second walk boards.

In an additional aspect, a first end of the third walk board is disposed adjacent to the front of the first walk board, and a second end of the third walk board is disposed adjacent to the front of the second walk board.

In a further aspect, the first, second, and third walk boards together define a continuous walk board.

In an additional aspect, walls extend downwardly from an inner edge of the first and second walk boards.

In a further aspect, the at least one longitudinally extending lower frame member includes a first longitudinally extending lower frame member and a second longitudinally extending lower frame member. The first longitudinally extending lower frame member is disposed on a first side of a longitudinal centerline of the watercraft receiving portion. The second longitudinally extending lower frame member is disposed on a second side of the longitudinal centerline of the watercraft receiving portion. The first walk board is disposed laterally outwardly from the first longitudinally extending lower frame member. The second walk board is disposed laterally outwardly from the second longitudinally extending lower frame member.

In an additional aspect, the lower frame further includes a laterally extending lower frame member connected to the first and second longitudinally extending lower frame members. The first wheel is operatively connected to a first end of the laterally extending lower frame member and the second wheel is operatively connected to a second end of the laterally extending lower frame member.

In a further aspect, a plurality of rollers are disposed on the first and second longitudinally extending lower frame members.

In an additional aspect, a releasable connector for releasably connecting a watercraft to the trailer is provided. The releasable connector is disposed on the longitudinal centerline of the watercraft receiving portion on a front portion thereof.

In a further aspect, an actuator is disposed to one side of the watercraft receiving portion. The actuator is operatively connected to the releasable connector. Actuation of the actuator causes the releasable connector to release the watercraft from the releasable connector.

In an additional aspect, an upper frame is connected to the lower frame. The first walk board is supported by the upper frame.

In a further aspect, a wall extends upwardly from an outer edge of the first walk board.

In an additional aspect, the generally horizontal upper surface is textured.

In a further aspect, the first walk board is at least 5 cm wide.

In an additional aspect, the lower frame includes watercraft supporting members. A portion of the first walk board is at least 35 cm vertically above the watercraft supporting members when the at least one longitudinally extending lower frame member is horizontal.

In a further aspect, the upper surface of the first walk board has a non-linear profile when viewed from a side elevation view of the trailer.

In an additional aspect, the upper surface of the first walk board has a convex profile when view from a side elevation view of the trailer.

In another aspect, the invention provides a watercraft trailer having a watercraft receiving portion and a lower frame adapted to support a watercraft in the watercraft receiving portion. The lower frame has at least one longitudinally extending lower frame member. The trailer also has a hitch coupler connected to a front of the lower frame, a first wheel and a second wheel operatively connected to the lower frame, a first walk board connected to the lower frame, and a step connected to the lower frame. The first walk board is disposed on a first side of the watercraft receiving portion. The step is disposed at least in part forwardly of the first walk board and is disposed at a vertically lower position than the first walk board.

In a further aspect, a pole extends vertically upwardly from the first walk board.

In an additional aspect, an upper frame is connected to the lower frame. The first walk board and the step are supported by the upper frame.

In a further aspect, the watercraft receiving portion is a first watercraft receiving portion disposed on a first side of a longitudinal centerline of the trailer. The trailer also has a second watercraft receiving portion disposed on a second side of the longitudinal centerline of the trailer. The first walk board is disposed between the first and the second watercraft receiving portions.

In an additional aspect, the at least one longitudinally extending lower frame member includes a first, second, third, and fourth longitudinally extending lower frame members. The first longitudinally extending lower frame member is disposed on a first side of a longitudinal centerline of the first watercraft receiving portion. The second longitudinally extending lower frame member is disposed on a second side of the longitudinal centerline of the first watercraft receiving portion. The third longitudinally extending lower frame member is disposed on a first side of a longitudinal centerline of the second watercraft receiving portion. The fourth longitudinally extending lower frame member is disposed on a second side of the longitudinal centerline of the second watercraft receiving portion. The first walk board is disposed laterally between the second and third longitudinally extending lower frame members.

In a further aspect, the lower frame further includes a laterally extending lower frame member connected to the first, second, third, and fourth longitudinally extending lower frame members. The first wheel is operatively connected to a first end of the laterally extending lower frame member and the second wheel is operatively connected to a second end of the laterally extending lower frame member.

In an additional aspect, a plurality of rollers are disposed on the first, second, third, and fourth longitudinally extending lower frame members.

In a further aspect, a releasable connector for releasably connecting a watercraft to the trailer is provided. The releasable connector is disposed on the longitudinal centerline of the watercraft receiving portion on a front portion thereof.

For purposes of this application, the end of the trailer having the hitch coupler should be understood as corresponding to the front end of the trailer and the terms related to spatial orientation such as forwardly, rearwardly, left, and right, are as they would accordingly be understood.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
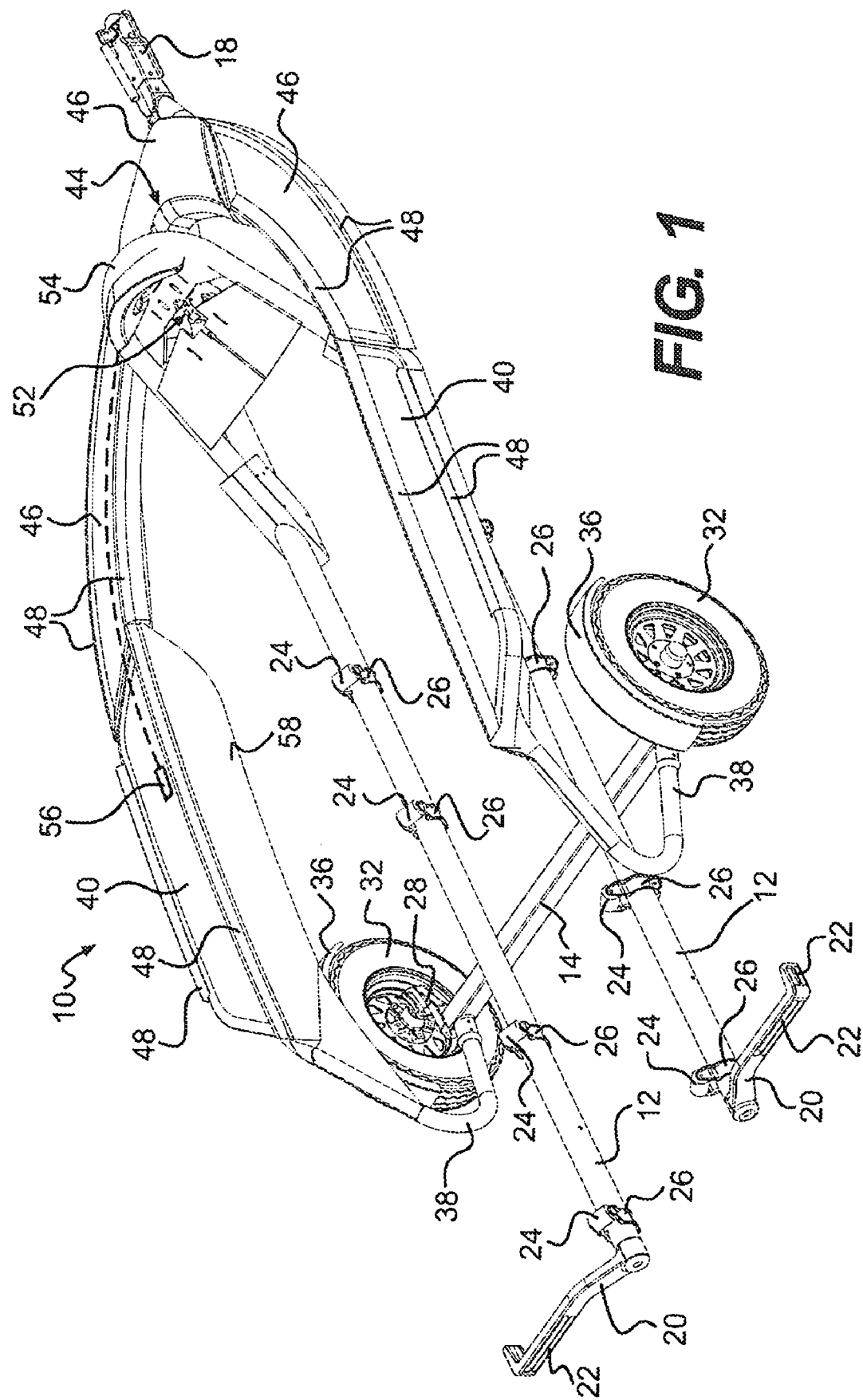
FIG. 1 is a perspective view, taken from a rear, right side, of a first embodiment of a watercraft trailer.

The present invention will be described with respect to trailers adapted to transport personal watercraft. However it should be understood that the dimensions of the embodiments of the trailers described herein could be increased to accommodate larger watercraft, such as jet boats. Also, the watercraft 47 mentioned below will not be described in detail herein as the construction of such watercraft is believed to be well known. An exemplary personal watercraft is described in detail in U.S. Pat. No. 7,128,014 B2, issued Oct. 31, 2006, the entirety of which is incorporated herein by reference. An exemplary jet boat is described in detail in United States Patent Publication No. 2007/0186839 A1, published Aug. 16, 2007, the entirety of which is incorporated herein by reference.

FIGS. 1 to 6 illustrate a first embodiment of a watercraft trailer 10. The trailer 10 has a lower frame having left and right longitudinally extending lower frame members 12 and a laterally extending lower frame member 14. The frame members 12 and 14 are preferably metal tubes, but other materials and shapes (beams for example) are contemplated.

The left and right longitudinally extending lower frame members 12 are disposed on either sides of a longitudinal centerline 16 (FIG. 5) of the trailer 10. The front portions of the left and right longitudinally extending lower frame members 12 bend inwardly towards the longitudinal centerline 16 and are connected at the longitudinal centerline 16 by welding, bolts or other mechanical fasteners.

A hitch coupler 18 is welded, fastened, or otherwise connected to the front of the left and right longitudinally extending lower frame members 12. The hitch coupler 18 allows the trailer 10 to be coupled to a matching tow hitch on a vehicle, thus allowing the trailer 10 to be towed by the vehicle. The features of the hitch coupler 18 will vary depending on the type of tow hitch to which one desires to couple the trailer 10. In a preferred embodiment, the hitch coupler 18 is adapted to be coupled to a tow-ball commonly used on road vehicles such as cars and trucks.

A bracket 20 is connected to the rear end of each of the longitudinally extending lower frame member 12 and extends laterally outwardly therefrom. Each bracket 20 has reflectors 22 disposed thereon. The reflectors 22 are required by many jurisdictions for the trailer 10 to be suitable for road use.

Figure 4:
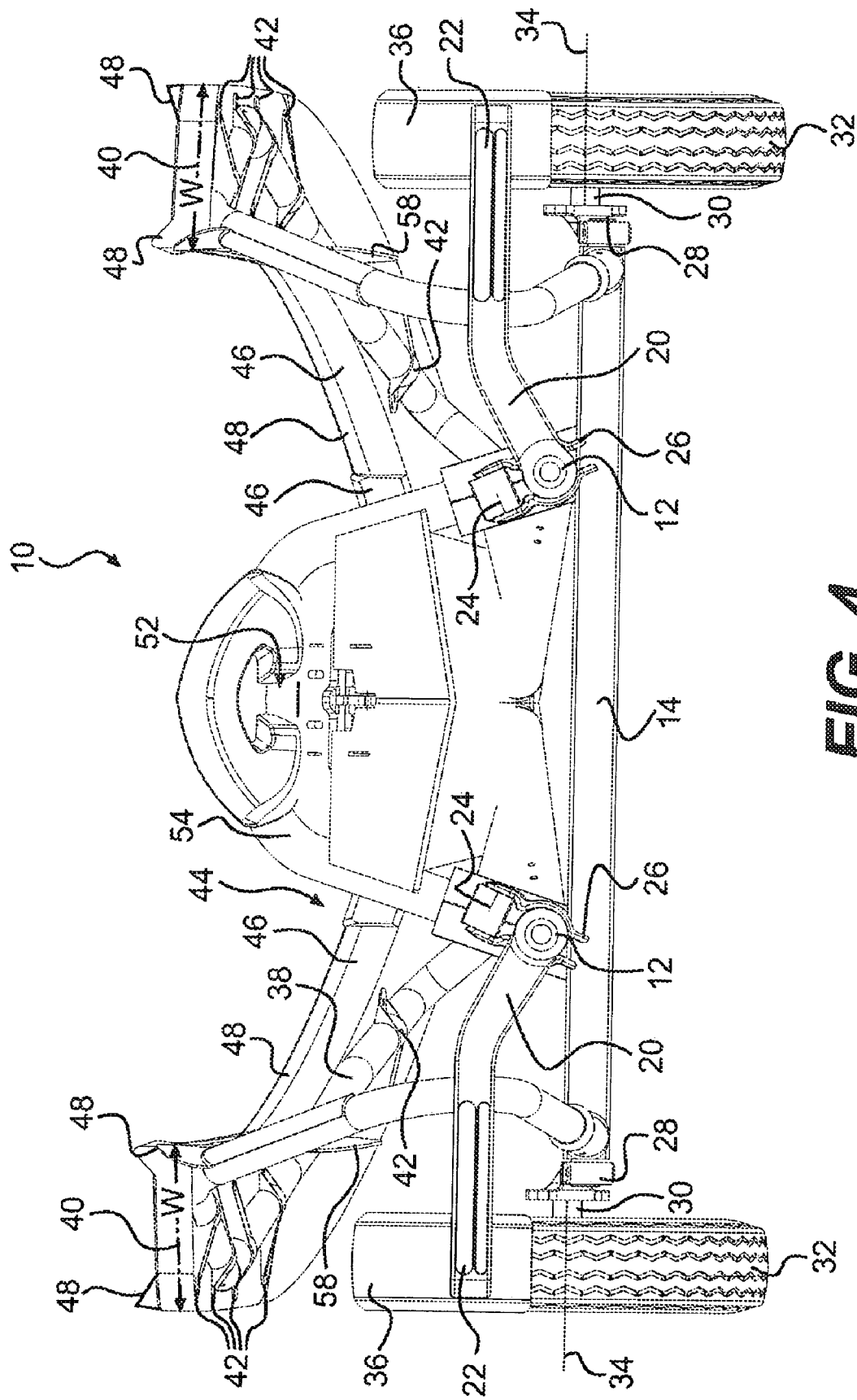
FIG. 4 is a rear elevation view of the trailer of FIG. 1.

Watercraft supporting members in the form of a plurality of low friction rollers 24 are connected to each of the longitudinally extending lower frame member 12 by brackets 26. The rollers 24 allow a watercraft for which the trailer 10 is adapted to easily slide in and out of the trailer 10. As best seen in FIG. 4, the rollers 24 are angled laterally inwardly. Angling the rollers 24 as shown makes the trailer 10 better adapted to receive watercraft having a V-shaped hull. The angle and position of the rollers 24 on the longitudinally extending lower frame members 12 can be adjusted to accommodate different watercraft. It is contemplated that the watercraft supporting members could alternatively be in the form of sliding boards or other structure to allow a watercraft to slide in and out of the trailer 10 with only moderate friction. It is also contemplated that the rollers 24 and brackets 26 could be omitted, in which case a watercraft would slide directly on the longitudinally extending frame members 12 and as such the longitudinally extending frame members 12 would act as the watercraft supporting members.

The laterally extending lower frame member 14 is disposed under the longitudinally extending lower frame members 12 and extends perpendicularly thereto. The laterally extending lower frame member 14 is connected the longitudinally extending lower frame members 12 by welding, bolts or other mechanical fasteners.

Figure 2:
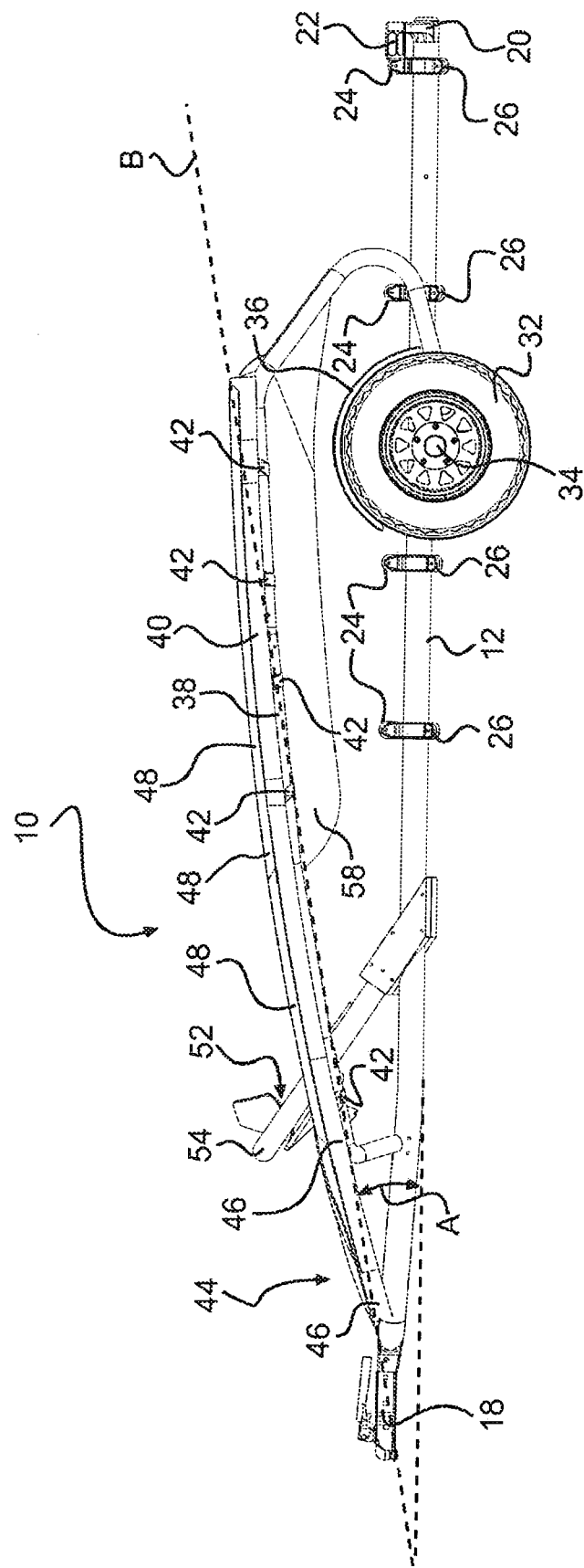
FIG. 2 is a left side elevation view of the trailer of FIG. 1.
Figure 3:
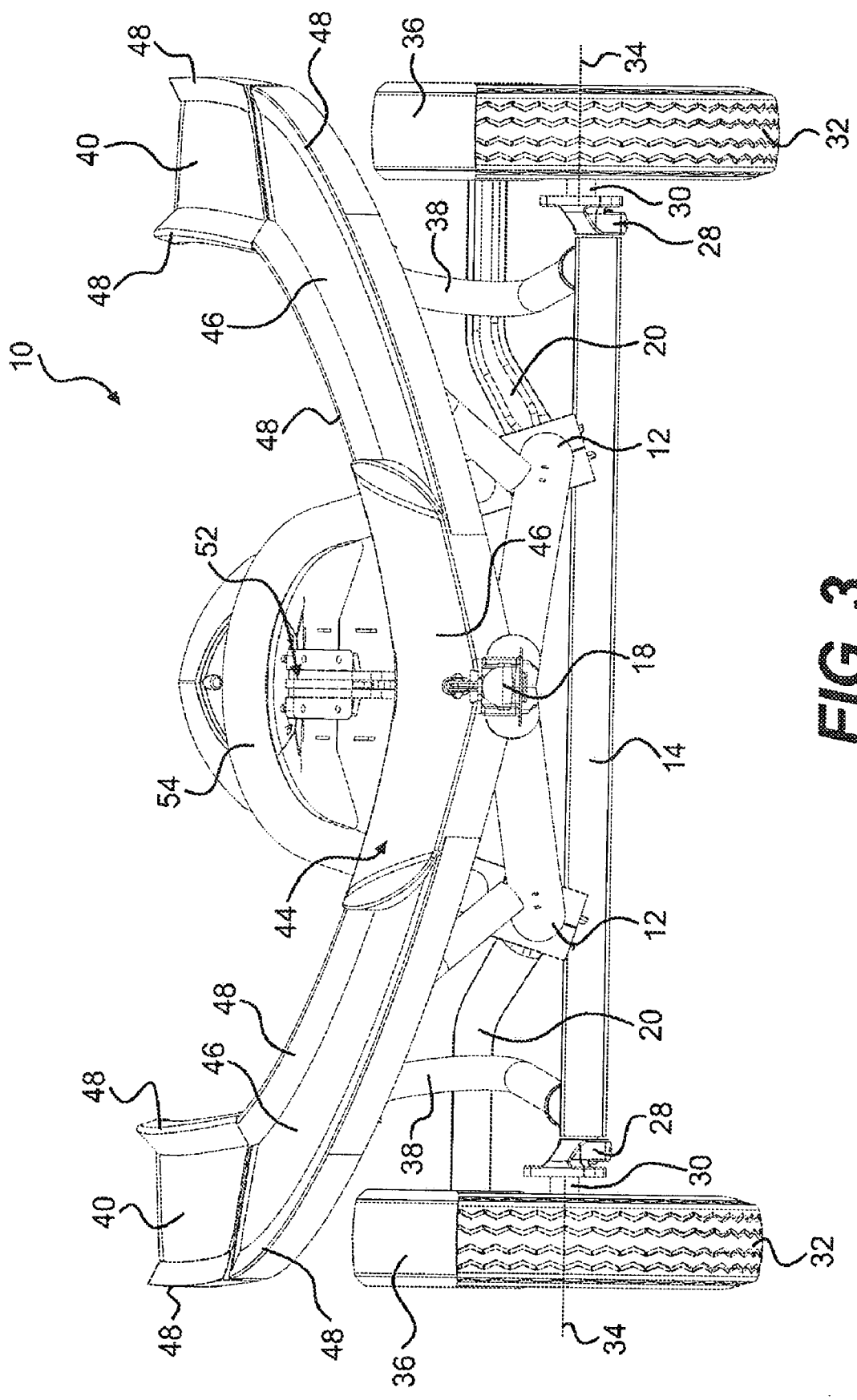
FIG. 3 is a front elevation view of the trailer of FIG. 1.

A wheel mount 28 is connected to each end of the laterally extending lower frame member 14 and extends forwardly therefrom. A wheel axle 30 (FIGS. 3 and 4) extends laterally outwardly from the forward end of each wheel mount 30. A wheel 32 is mounted to each wheel axle 30 for rotation about a wheel rotation axis 34 (FIG. 2). A fairing 36 is mounted over each wheel 32. The connections between the wheel mounts 28 and the laterally extending frame member 14 include elastomeric members (not shown) which allow for some torsion of the wheel mounts 28 relative to the laterally extending frame member 14, thus acting as a suspension for the trailer 10. It is contemplated that other type of suspensions could be used or that no suspension could be used. It is also contemplated that the wheels 32 could be mounted to the laterally extending frame member 14 such that the wheel rotation axis 34 could be in alignment with the laterally extending frame member 14 or disposed rearwardly of the laterally extending frame member 14.

The trailer 10 also has an upper frame having left and right upper frame members 38. The frame members 38 are preferably metal tubes, but other materials and shapes (beams for example) are contemplated. The rear ends of the upper frame members 38 are connected to the laterally extending lower frame member 14 at positions laterally outwardly of the longitudinally extending lower frame members 12. It is contemplated that the rear ends of the upper frame members 38 could be connected elsewhere on the lower frame, such as on the longitudinally extending lower frame members 12. The forward ends of the upper frame members 38 are connected to the front portions of their corresponding longitudinally extending lower frame members 12.

Figure 6:
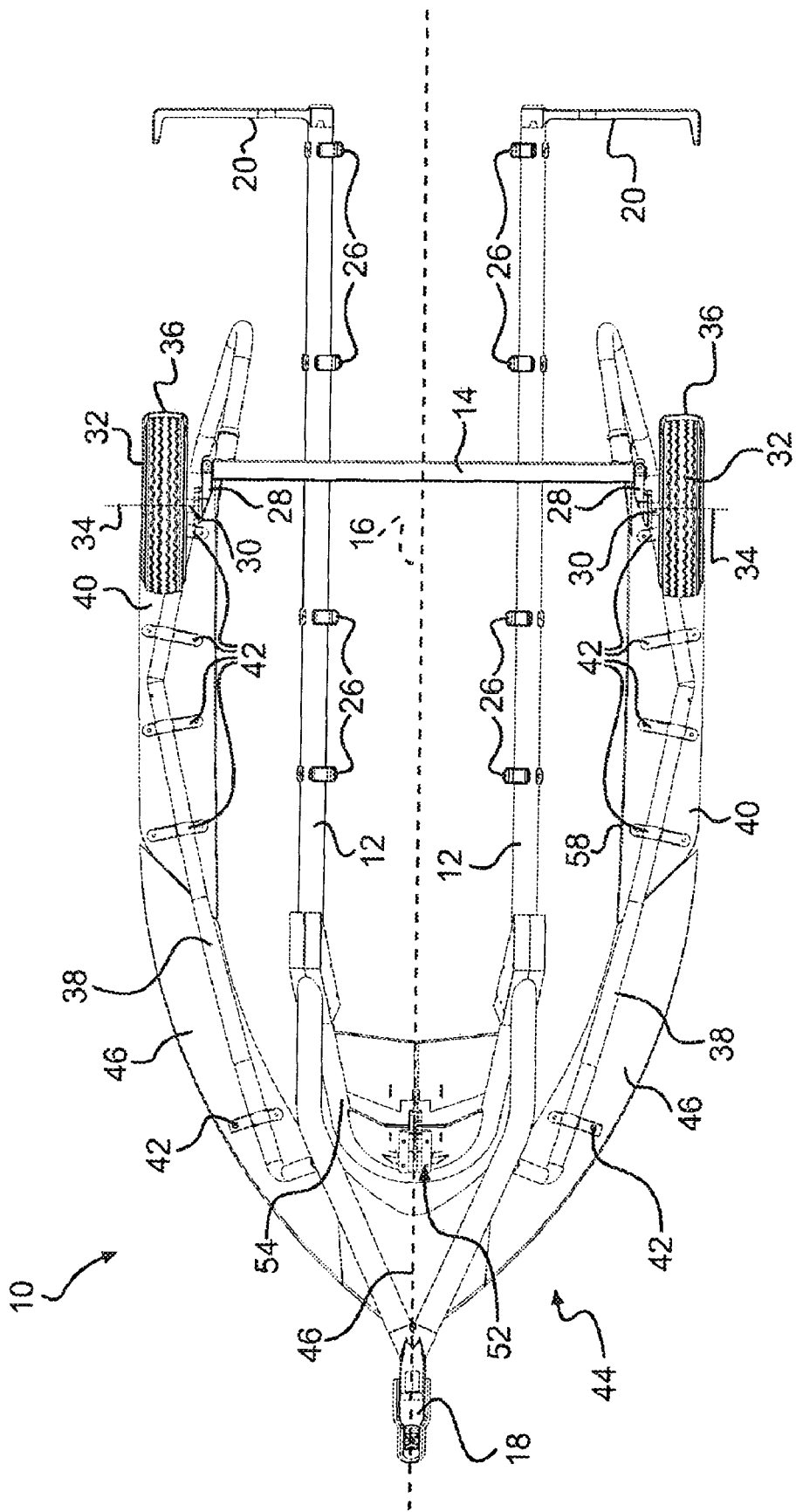
FIG. 6 is a bottom plan view of the trailer of FIG. 1.
Figure 7:
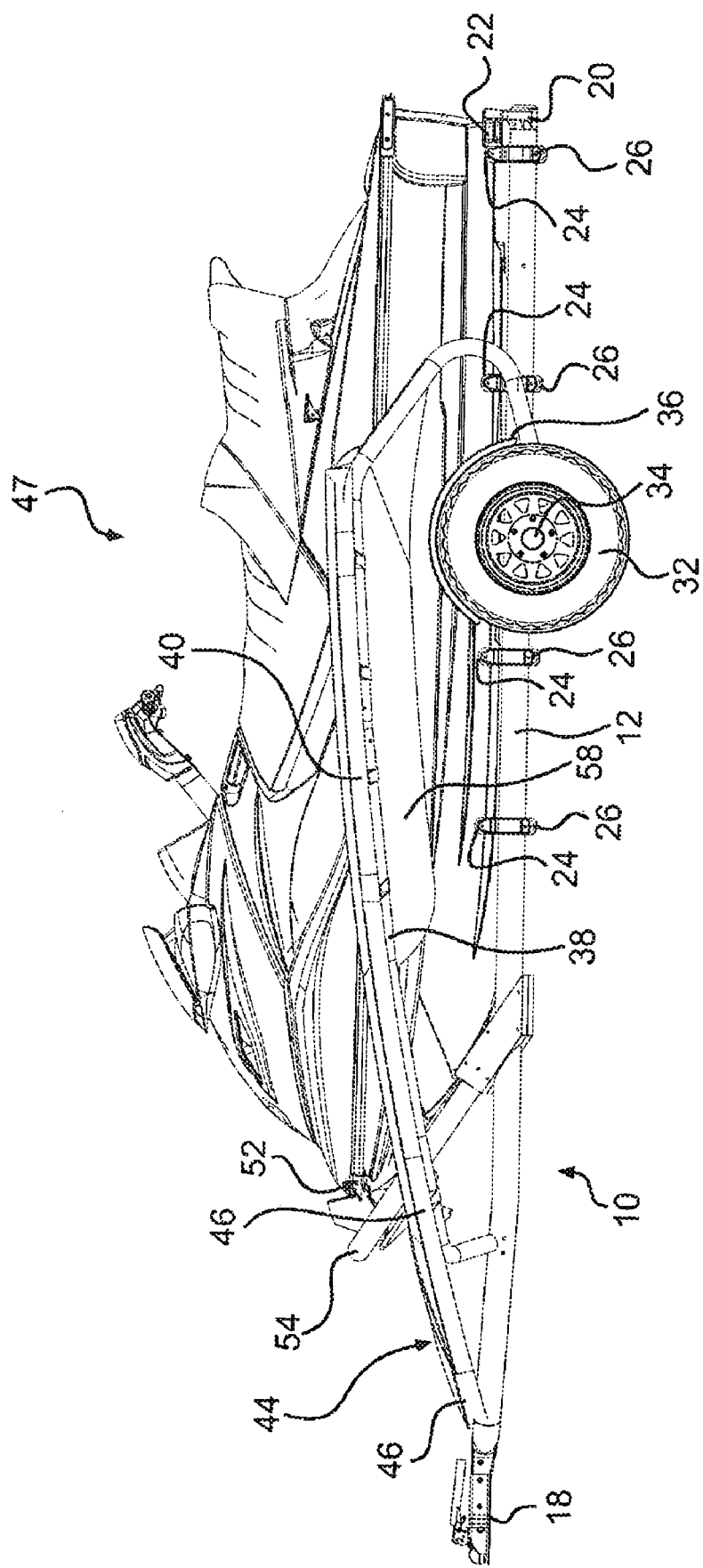
FIG. 7 is a left side elevation view of the trailer of FIG. 1 with a personal watercraft supported thereon.

The left upper frame member 38 supports a left walk board 40 which is held in place on the left upper frame member 38 by brackets 42 (FIG. 6). As can be seen, the left walk board 40 is disposed to the left of the left longitudinally extending lower frame member 12. Similarly, the right upper frame member 38 supports a right walk board 40 which is held in place on the right upper frame member 38 by brackets 42. As can also be seen, the right walk board 40 is disposed to the right of the right longitudinally extending lower frame member 12. The left and right walk boards 40 are mirror images of each other, however it is contemplated that they could not be. A generally U-shaped walk board 44 is disposed forwardly of the left and right walk boards 40. The rear of the generally U-shaped walk board 44 is supported by the left and right upper frame members 38 and the front of the generally U-shaped walk board 44 rests on the forward portions of the left and right longitudinally extending lower frame members 12 (see FIG. 2). The generally U-shaped walk board 44 is held onto the left and right upper frame members 38 by brackets 42. The rear ends of the U-shaped walk board 44 are disposed adjacent to the forward ends of the left and right walk boards 40 so as to form a continuous walk board. The generally U-shaped walk board 44 is made of three sections 46, but it is contemplated that it could be made of a single part, two sections, or more than three sections. Similarly, the left and right walk boards 40 could be made of multiple sections. It is also contemplated that the two walk boards 40 and the generally U-shaped walk board 44 could be integrally formed as a single part.

Figure 9:
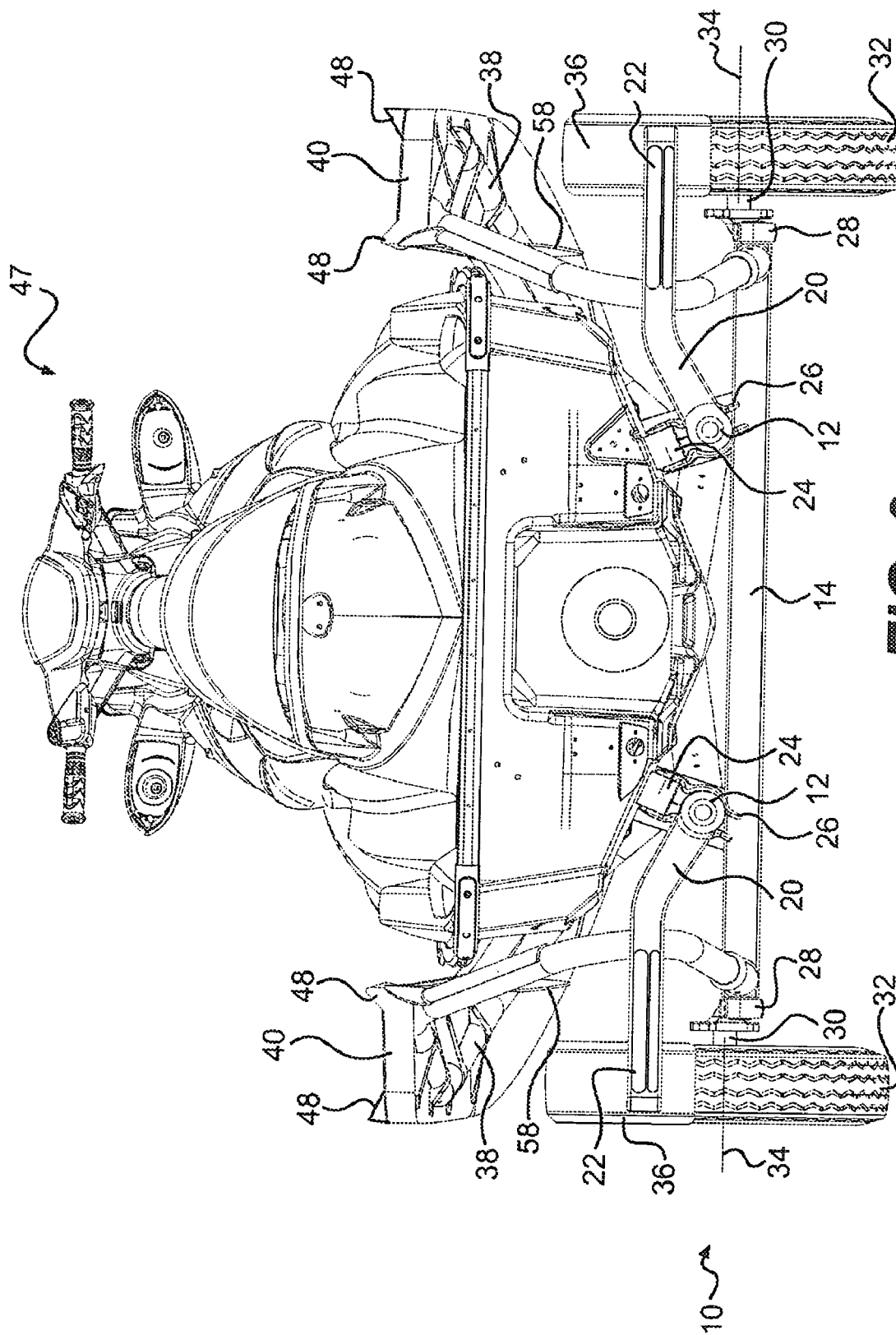
FIG. 9 is a rear elevation view of the trailer and watercraft of FIG. 7.
Figure 10:
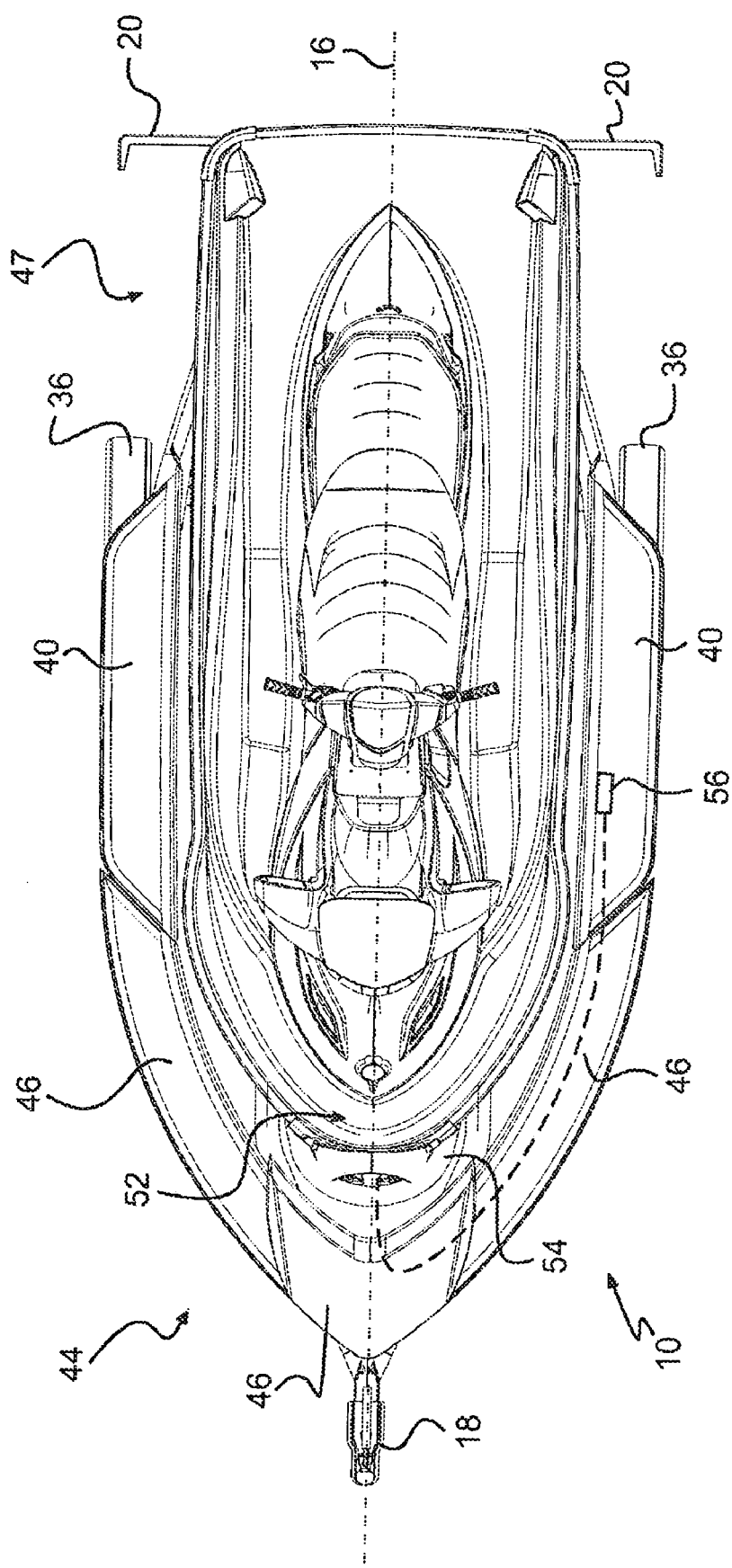
FIG. 10 is a top plan view of the trailer and watercraft of FIG. 7.

The inner edges of the walk boards 40 and of the generally U-shaped walk board 44 define therebetween a watercraft receiving portion. As seen in FIG. 10, a watercraft 47 received in the watercraft receiving portion occupies the majority of the watercraft receiving portion. The distance D (FIG. 5) between the inner edges of the left and right walk boards 40 is greater than or equal to a width of a watercraft for which the trailer 10 is adapted. For a trailer 10 for a personal watercraft, such as the personal watercraft 47 shown in FIGS. 7 to 10, the distance D is preferably at least 100 cm. It is contemplated however that the distance D could be less than a width of a watercraft for which the trailer 10 is adapted. This would be the case when the walk boards 40 are arranged so as to rest against a lower portion of the hull of the watercraft since the width of the hull generally decreases from its upper portion to the keel of the watercraft.

The walk boards 40, 44 provide surfaces onto which a person can walk when going from the watercraft 47 supported by the trailer 10 to the ground or vice versa. For this reason, the walk boards 40, 44 have generally horizontal upper surfaces in the lateral direction (see FIGS. 3 and 4 for example). In order to provide a sufficient surface onto which a person can step, a width W (FIG. 4) of the walk boards 40, 44 is at least 5 cm, but preferably at least 20 cm. To help prevent the feet of people walking on the walk boards 40, 44 from slipping off the walk boards 40, 44, the walk boards 40, 44 are provided with walls 48 extending upwardly from the inner and outer edges of the walk boards 40, 44. It is contemplated that the walls 48 could be provided only on the outer edges of the walk board 40, 44, only on the inner edges of the walk boards 40, 44, or completely omitted. It is also contemplated that only some of the walk boards 40, 44 could be provided with walls 48 or that only portions of the walk boards 40, 44 could be provided with walls 48. The upper surfaces of the walk boards 40, 44 are preferably textured to also help prevent the feet of people walking on the walk boards 40, 44 from slipping off the walk boards 40, 44. The texturing of the walk boards 40, 44 can be achieved by mixing an abrasive, such as sand, in the paint used to cover the walk boards 40, 44. Other ways of texturing the upper surfaces of the walk boards 40, 44 are also contemplated, such as by creating a raised pattern in the upper surfaces, or by applying a rubber-type carpet on the walk boards 40, 44.

Figure 8:
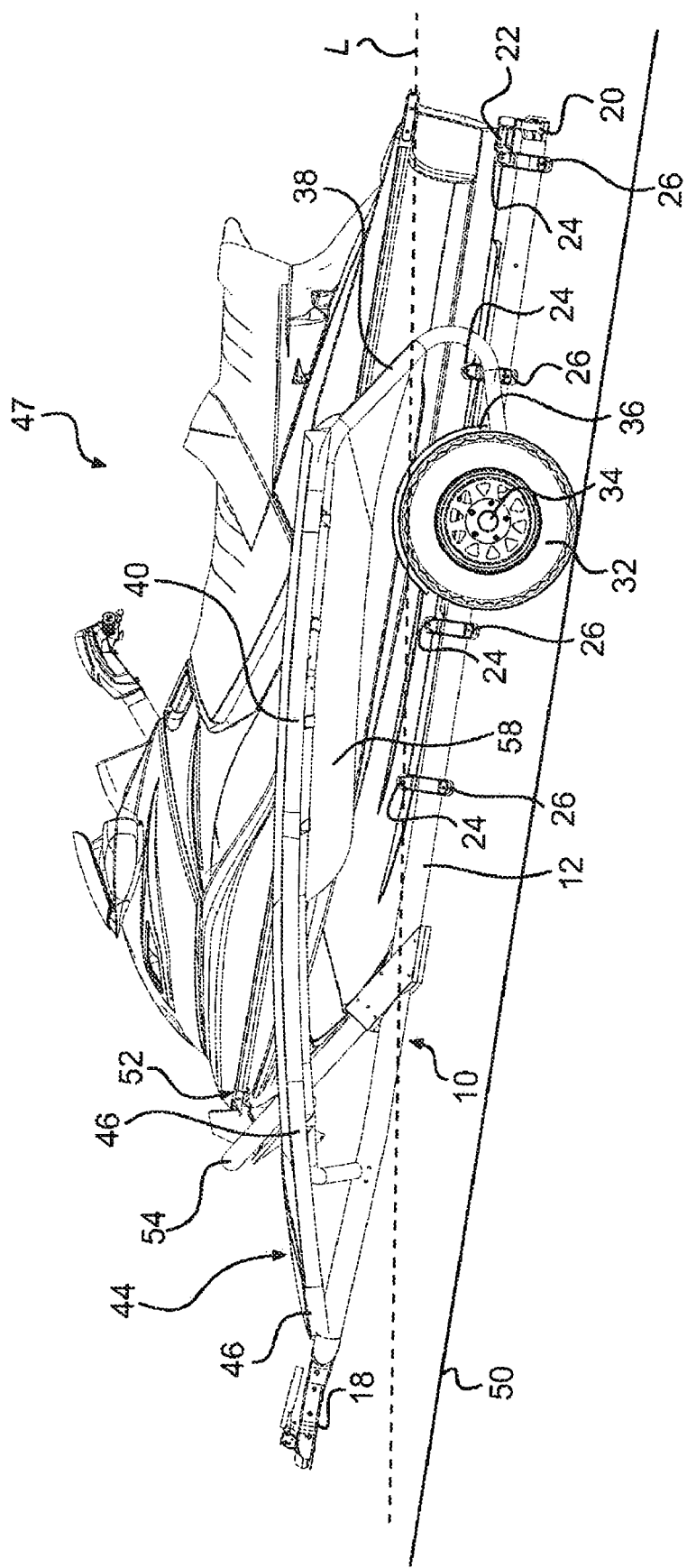
FIG. 8 is a left side elevation view of the trailer and watercraft of FIG. 7 with the trailer being disposed on a ramp.

In order to facilitate getting on or off the watercraft 47 when it is supported by the trailer 10, the walk boards 40, 44 are angled in a longitudinal direction relative to the lower frame members 12 such that a distance between the walk boards 40, 44 and the lower frame members 12 is shorter at a front of the walk boards 40, 44 than at a rear of the walk boards 40, 44, as seen in FIG. 2. By angling the walk boards 40, 44 as shown, when the trailer 10 is backed down a ramp 50 (either natural or man made) as shown in FIG. 8 in order to receive or launch the watercraft 47, the walk boards 40, 44 are generally horizontal thus providing a surface that can be easily walked on. A person getting off the watercraft 47 simply steps on one of the walk boards 40, walks towards a front of the trailer 10 along the walk board 40 and then the walk board 44, and finally steps down from the trailer 10 at a front thereof where there is no water or where the water is shallow (the water level is indicated by line L in FIG. 8). As would be understood, getting on the watercraft 47 from the shore is accomplished by doing the same steps in the reverse direction. Angling the generally U-shaped walk board 44 also reduces the distance from which a person has to step up to or down from the trailer 10 at a front thereof. The angle A (FIG. 2) between the longitudinally extending lower frame members 12 and a line B extending through the back of the walk board 40 and a front of the walk board 44 is preferably between 5 and 25 degrees.

It is contemplated that only one of the walk boards 40 could be used with the generally U-shaped walk board 44. It is also contemplated that generally U-shaped walk board 44 could be omitted and that only one or both walk boards 40 could be used, in which case the walk board(s) 40 would preferably be extended closer towards the front of the trailer 10. It is also contemplated that only the generally U-shaped walk board 44 could be used, in which case the generally U-shaped walk board 44 would preferably be extended further back. In any one of these alternative embodiments, the angle between the longitudinally extending lower frame members 12 and a line extending through the back of the walk board(s) 40 and/or 44 being used and a front of the walk board(s) 40 and/or 44 being used is also preferably between 5 and 25 degrees. By having walk boards 40 and/or 44 only along one side of the trailer 10, the overall width of the trailer 10 can be reduced.

As can best seen in FIG. 2, when viewed from a side elevation view of the trailer 10, the walk boards 40, 44 preferably have a non-linear profile, although linear profiles are contemplated. The non-linear profile is preferably a convex profile. By having a non-linear profile, the range of ramp angles for which at least a portion of the walk boards 40, 44 will provide adequate walking surfaces is increased. For example, if the walk boards 40, 44 have a linear profile and are disposed at an angle A of 15 degrees, they will provide adequate walking surfaces for ramp angles between approximately 12 to 18 degrees. However, if the walk boards 40, 44 have different portions for which the angle between each portion and the longitudinally extending lower frame members 12 varies between 10 and 20 degrees, at least a portion of the walk boards 40, 44 will provide adequate walking surfaces for ramp angles between approximately 7 and 23 degrees (as would be understood, the portion providing adequate walking surfaces at a ramp angle of 23 degrees will be different from the portion providing these surfaces at a ramp angle of 7 degrees).

At least a portion of the walk boards 40 is at least 35 cm vertically above the watercraft supporting members (i.e. rollers 24 in this embodiment) when the longitudinally extending lower frame members 12 are horizontal as shown in FIG. 2. By having a portion of the walk boards 40 sufficiently raised above the watercraft supporting members, the distance by which the trailer 10 can be lowered down the ramp 50 can be increased while still keeping the walk boards 40 above the water level L. Having a portion of the walk boards 40 sufficiently raised above the watercraft supporting members also facilitates getting on or off the watercraft 47 as the distance between the walk boards 40 and the surfaces on which a person would step on in the watercraft 47 is reduced (see FIGS. 7 to 9). Also, having a portion of the walk boards 40 sufficiently raised above the watercraft supporting members allows the walk boards 40 to be used to guide the watercraft 47 into the watercraft receiving portion as discussed below.

Figure 5:
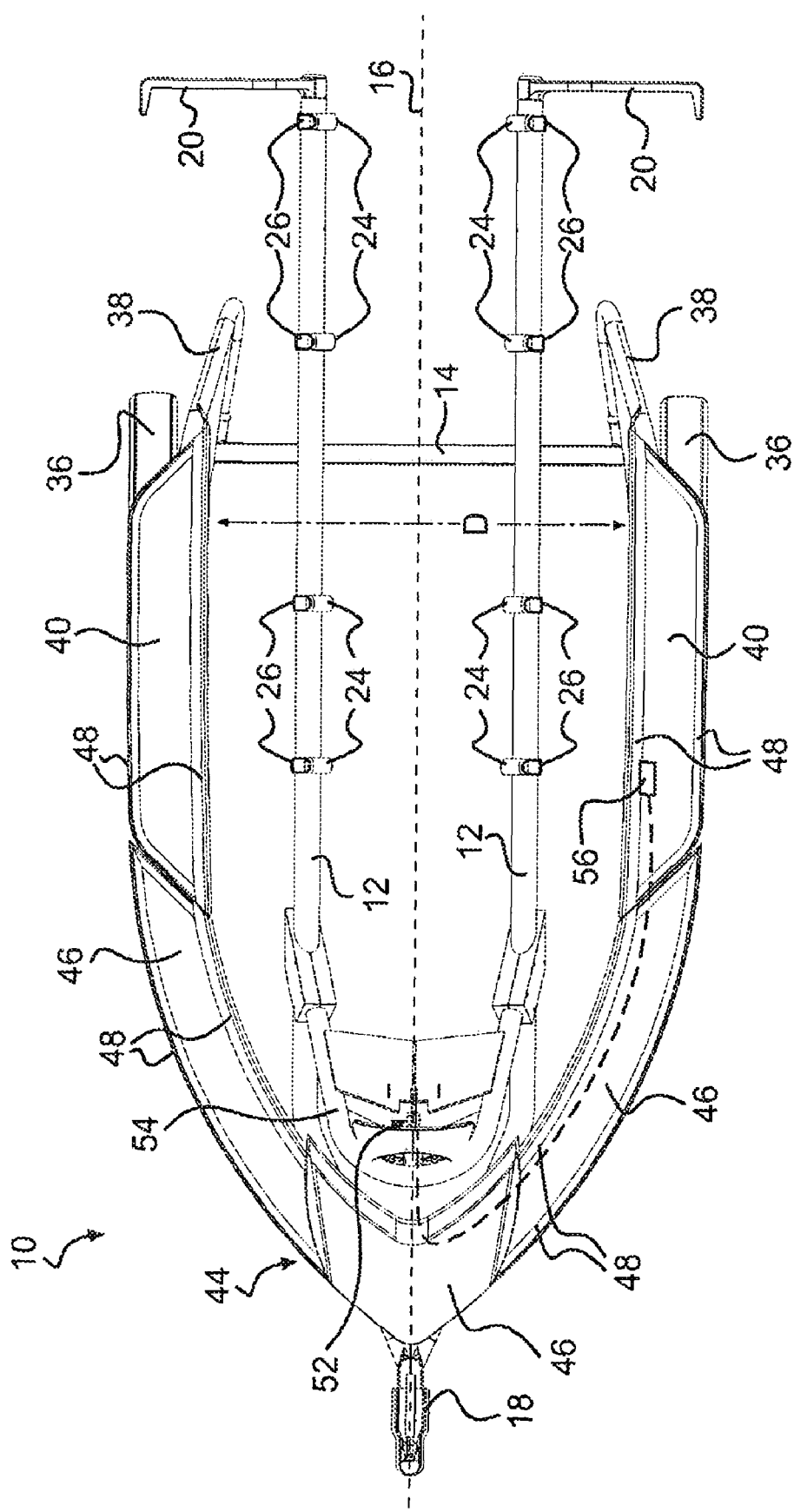
FIG. 5 is top plan view of the trailer of FIG. 1.

As best seen in FIGS. 1, 4, and 5, the trailer 10 is provided with a releasable connector 52 for connecting the watercraft 47 to the trailer 10. The releasable connector 52 is disposed on the longitudinal centerline of the watercraft receiving portion (which corresponds to the longitudinal centerline 16 of the trailer 10) at a front of the watercraft receiving portion. The releasable connector 52 is supported by an inverted U-shaped tubular member 54 having its ends connected to the longitudinally extending lower frame members 12. When the watercraft 47 enters the watercraft receiving portion and contacts the releasable connector 52 as shown in FIG. 8, the releasable connector 52 automatically clamps onto the watercraft 47 thereby connecting the watercraft 47 to the trailer 10. An actuator 56, in the form of a lever, a handle, a button, or a switch, is mechanically or electrically connected to the releasable connector 52. Actuating the actuator 56 causes the releasable connector 52 to release the watercraft 47, thereby allowing the watercraft 47 to be launched from the trailer 10. For example, the actuator 56 could be a handle connected via a cable to the releasable connector 52 such that pulling on the handle pulls on the cable which causes the releasable connector 56 to release the watercraft 47. Alternatively, the actuator 56 could be a button connected via an electrical wire to a solenoid actuator operatively connected to the releasable connector 52 such that pushing the button actuates the solenoid actuator which causes the releasable connector 56 to release the watercraft 47. The actuator 56 is preferably disposed on one side of the watercraft receiving portion such that a person on the watercraft 47 can reach the actuator 56 to release the watercraft 10 while being on the watercraft. It is contemplated that the releasable connector could be replaced by a winch which hooks the front of the watercraft 47 or by other suitable connectors.

The inner edges of the walk boards 40 act as guides for aligning the watercraft 47 with the watercraft receiving portion when the watercraft 47 is being driven onto the trailer 10. In order to increase the guiding surface, and to prevent the watercraft 47 from becoming stuck under the walk boards 40, walls 58 extend downwardly from the inner edges of the walk boards 40. If the watercraft 47 is driven out of alignment into the watercraft receiving portion, the walk boards 40 will cause it to become aligned between the longitudinally extending lower frame members 12 as the watercraft continues to move forward, until the watercraft 47 becomes supported by the rollers 26 (and therefore by the lower frame as seen in FIG. 9), and the watercraft 47 is finally connected to the trailer by the releasable connector 52.

It is contemplated that the angled walk boards 40, 44 used on the trailer 10 could be used on a trailer having two watercraft receiving portions disposed side by side in order to accommodate two watercraft, similar to the trailer 100 described below. Such a trailer would have one walk board 40 disposed on each side of the trailer and another walk board 40 disposed on the center which would be in common for both watercraft receiving portions. Two generally U-shaped walk boards 44 would be provided side-by-side or, alternatively, a single W-shaped walk board. It is contemplated that in an alternative embodiment, no central walk board 40 would be provided. It is also contemplated that in another alternative embodiment, only the central walk board 40 would be provided. By having fewer than three walk boards 40, the overall width of the trailer 10 can be reduced.

Figure 11:
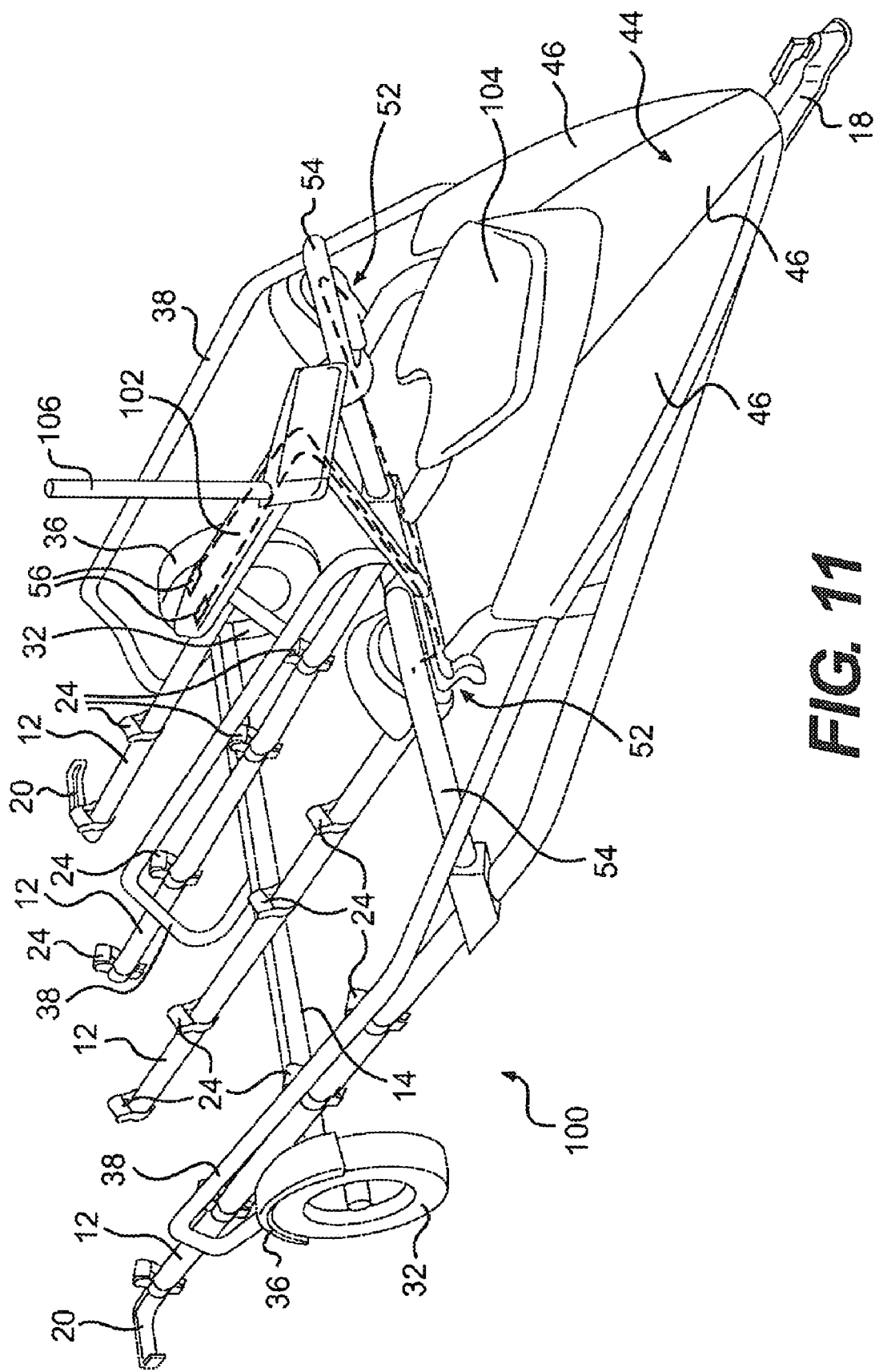
FIG. 11 is a perspective view, taken from a front, right side, of a second embodiment of a watercraft trailer.
Figure 12:
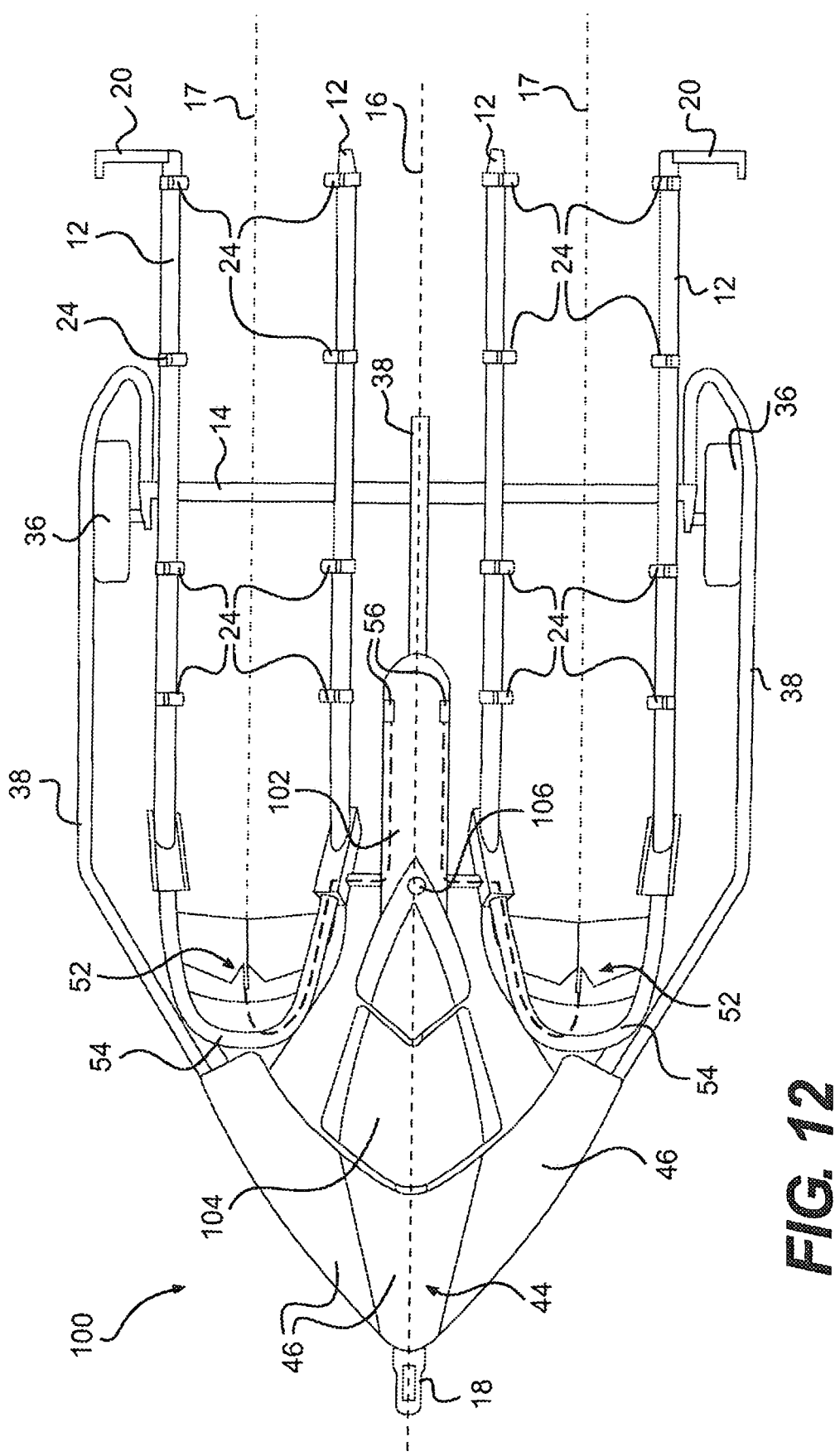
FIG. 12 is a top plan view of the trailer of FIG. 11.
Figure 13:
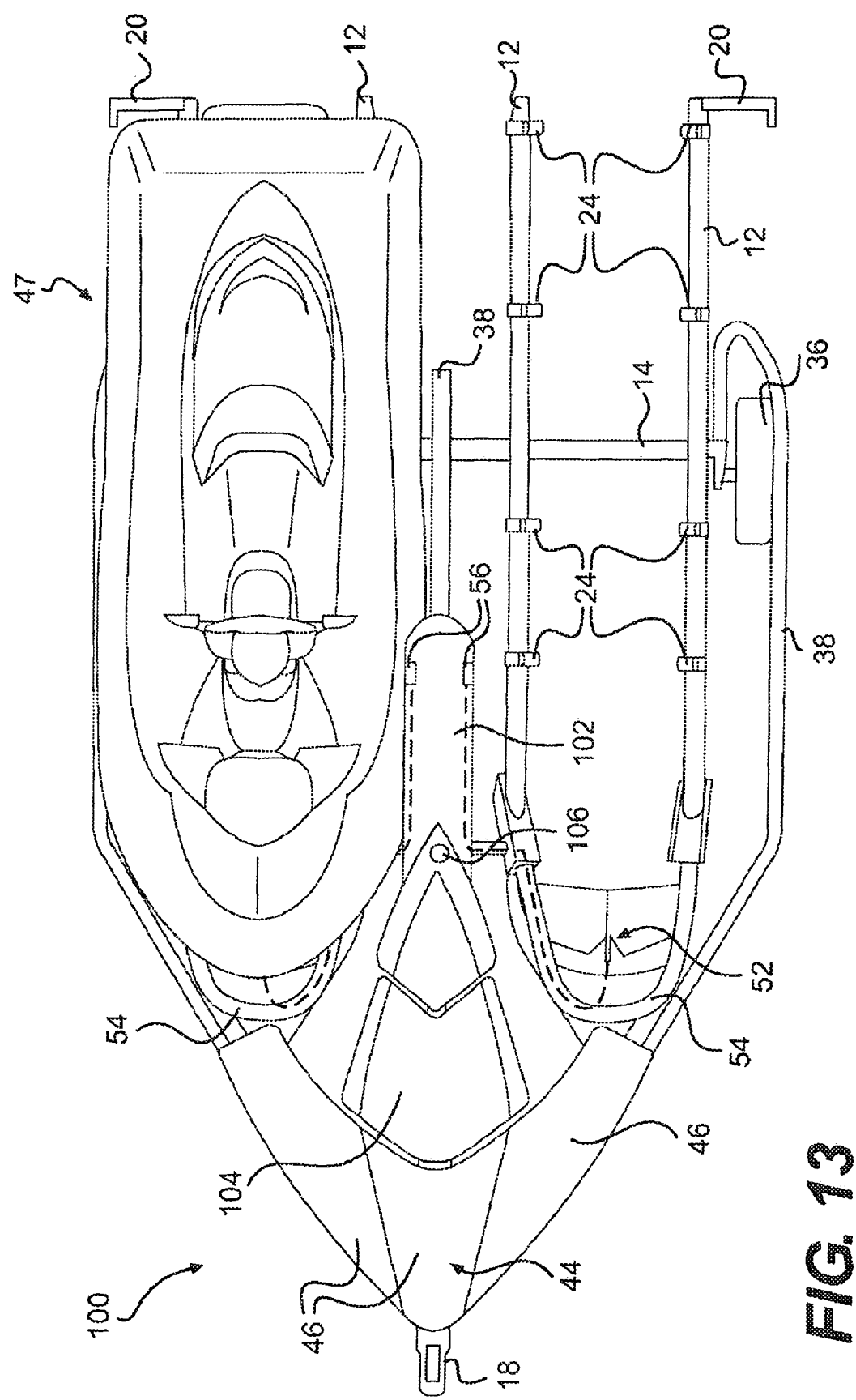
FIG. 13 is top plan view of the trailer of FIG. 11 with a personal watercraft supported thereon.

Turning now to FIGS. 11 to 13, the watercraft trailer 100 will be described. For simplicity, the features and components of the trailer 100 which are similar to those of the trailer 10 have been labelled with the same reference numeral and will not be described again below.

As can be seen, the trailer 100 is adapted to transport two watercraft such as watercraft 47 (FIG. 13). As such, the trailer 100 has a right and a left upper frame member 38, and a central upper frame member 38 disposed on the longitudinal centerline 16 of the trailer. The right and central upper frame members 38 define a right watercraft receiving portion therebetween, and the left and central upper frame members 38 define a left watercraft receiving portion therebetween. Each watercraft receiving portion has a longitudinal centerline 17. The trailer 100 has four longitudinally extending lower frame members 12 arranged as shown and a single laterally extending lower frame member 14 to connect the two wheels 32. Only the two laterally outermost longitudinally extending lower frame members 12 are provided with brackets 20. Each watercraft receiving portion has a releasable connector 52 supported on the longitudinal centerline 17 thereof by an inverted U-shaped tubular member 54. Each releasable connector 52 has an actuator 56 associated therewith. The actuators 56 are disposed on the walk board 102 (described below). A generally U-shaped walk board 44 is disposed at the front of the trailer 100 and is supported in part by the left and right upper frame members 38.

In trailer 100, the walk boards 40 have been replaced by a walk board 102 and a step 104 described in greater detail below. Since the walk boards 40 are no longer present, it is the upper frame members 38 that provide the guiding feature that was provided by the walk boards 40 in the trailer 10.

The walk board 102 and step 104 are supported by the central upper frame member 38, and as such can be used by a person getting on or off a watercraft disposed in either one of the watercraft receiving portions. The step 104 is disposed at least in part forwardly of the walk board 102 and at a vertically lower position than the walk board 102. Similarly, the generally U-shaped walk board 44 is disposed at least in part forwardly of the step 104 and at a vertically lower position than the step 104. As such, the walk board 102, the step 104, and the generally U-shaped walk board 44 act as stairs which permit a person to easily get from a watercraft supported in the trailer 100 to the ground and vice versa. It is contemplated that the generally U-shaped walk board 44 could be omitted, in which case the step 104 would preferably extend closer to the front of the trailer 100. It is also contemplated that the right and left upper frame members 38 could also each be provided with a walk board 102 and a step 104.

Like the walk boards 40, the walk board 102 and the step 104 are at least 5 cm wide. In the embodiment shown, the step 104 is wider than the walk board 102, and the generally U-shaped walk board 44 is wider than the step 104. This allows a person stepping down from the trailer 100 to move laterally away from the longitudinal centerline 16, thus avoiding stepping on the hitch coupler 18.

Similarly to the walk boards 40, the upper surfaces of the walk board 102 and step 104 are preferably textured to help prevent the feet of people walking on the walk board 102 and step 104 from slipping off the walk board 102 and step 104. A pole 106 extending vertically upwardly form the walk board 102 can be grabbed by a person walking on the walk board 102 and the step 104, which can also help prevent a person from slipping off the walk board 102 and step 104.

It is contemplated that one or both walk boards 40 of the trailer 10 described above could be replaced by the walk board 102 and step 104.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:
1. A watercraft trailer comprising:
a watercraft receiving portion;

a lower frame adapted to support a watercraft in the watercraft receiving portion, the lower frame comprising at least one longitudinally extending lower frame member;

a hitch coupler connected to a front of the lower frame;

a first wheel and a second wheel operatively connected to the lower frame; and a first walk board connected to the lower frame, the first walk board being disposed on a first side the watercraft receiving portion, the first walk board being disposed in a longitudinal direction relative to the at least one longitudinally extending lower frame member such that a distance between the first walk board and the at least one longitudinally extending lower frame member is less at a front of the first walk board than at a rear of the first walk board, the first walk board defining a generally horizontal upper surface in a lateral direction.

2. The trailer of claim 1, wherein an angle between a line extending from the front of the first walk board to the rear of the first walk board and the at least one longitudinally extending lower frame member is between 5 and 25 degrees.

3. The trailer of claim 1, further comprising a second walk board connected to the lower frame, the second walk board being disposed on a second side of the watercraft receiving portion, the second walk board being disposed in the longitudinal direction relative to the at least one longitudinally extending lower frame member such that a distance between the second walk board and the at least one longitudinally extending lower frame member is shorter at a front of the second walk board than at a rear of the second walk board, the second walk board defining a generally horizontal upper surface in the lateral direction.

4. The trailer of claim 3, wherein a first angle between a line extending from the front of the first walk board to the rear of the first walk board and the at least one longitudinally extending lower frame member is between 5 and 25 degrees, a second angle between the a line extending from the front of the second walk board to the rear of the second walk board and the at least one longitudinally extending lower frame member is between 5 and 25 degrees, and the first angle is equal to the second angle.

5. The trailer of claim 3, wherein a lateral distance between the first and second walk boards is at least 100 cm.

6. The trailer of claim 3, further comprising an upper frame connected to the lower frame, the first and second walk boards being supported by the upper frame.

7. The trailer of claim 3, further comprising a third generally U-shaped walk board disposed forwardly of the first and second walk boards.

8. The trailer of claim 7, wherein a first end of the third walk board is disposed adjacent to the front of the first walk board, and a second end of the third walk board is disposed adjacent to the front of the second walk board.

9. The trailer of claim 7, wherein the first, second, and third walk boards together define a continuous walk board.

10. The trailer of claim 3, further comprising walls extending downwardly from an inner edge of the first and second walk boards.

11. The trailer of claim 3, wherein the at least one longitudinally extending lower frame member includes a first longitudinally extending lower frame member and a second longitudinally extending lower frame member, the first longitudinally extending lower frame member being disposed on a first side of a longitudinal centerline of the watercraft receiving portion, the second longitudinally extending lower frame member being disposed on a second side of the longitudinal centerline of the watercraft receiving portion, the first walk board being disposed laterally outwardly from the first longitudinally extending lower frame member, and the second walk board being disposed laterally outwardly from the second longitudinally extending lower frame member.

12. The trailer of claim 11, wherein the lower frame further includes a laterally extending lower frame member connected to the first and second longitudinally extending lower frame members; and wherein the first wheel is operatively connected to a first end of the laterally extending lower frame member and the second wheel is operatively connected to a second end of the laterally extending lower frame member.

13. The trailer of claim 11, further comprising a plurality of rollers disposed on the first and second longitudinally extending lower frame members.

14. The trailer of claim 11, further comprising a releasable connector for releasably connecting a watercraft to the trailer, the releasable connector being disposed on the longitudinal centerline of the watercraft receiving portion on a front portion thereof.

15. The trailer of claim 14, further comprising an actuator disposed to one side of the watercraft receiving portion, the actuator being operatively connected to the releasable connector;

wherein actuation of the actuator causes the releasable connector to release the watercraft from the releasable connector.

16. The trailer of claim 1, further comprising an upper frame connected to the lower frame, the first walk board being supported by the upper frame.

17. The trailer of claim 1, further comprising a wall extending upwardly from an outer edge of the first walk board.

18. The trailer of claim 1, wherein the generally horizontal upper surface is textured.

19. The trailer of claim 1, wherein the first walk board is at least 5 cm wide.

20. The trailer of claim 1, wherein the lower frame includes watercraft supporting members; and wherein a portion of the first walk board is at least 35 cm vertically above the watercraft supporting members when the at least one longitudinally extending lower frame member is horizontal.

21. The trailer of claim 1, wherein the upper surface of the first walk board has a non-linear profile when viewed from a side elevation view of the trailer.

22. The trailer of claim 21, wherein the upper surface of the first walk board has a convex profile when view from a side elevation view of the trailer.

23. A watercraft trailer comprising:

a watercraft receiving portion;

a lower frame adapted to support a watercraft in the watercraft receiving portion, the lower frame comprising at least one longitudinally extending lower frame member;

a hitch coupler connected to a front of the lower frame;

a first wheel and a second wheel operatively connected to the lower frame; and a first walk board connected to the lower frame, the first walk board being disposed on a first side of the watercraft receiving portion; and a step connected to the lower frame, the step being disposed at least in part forwardly of the first walk board, and the step being disposed at a vertically lower position than the first walk board.

24. The trailer of claim 23, further comprising a pole extending vertically upwardly from the first walk board.

25. The trailer of claim 23, further comprising an upper frame connected to the lower frame, the first walk board and the step being supported by the upper frame.

26. The trailer of claim 23, wherein the watercraft receiving portion is a first watercraft receiving portion disposed on a first side of a longitudinal centerline of the trailer;
the trailer further comprising a second watercraft receiving portion disposed on a second side of the longitudinal centerline of the trailer; and
wherein the first walk board is disposed between the first and the second watercraft receiving portions.

27. The trailer of claim 26 wherein the at least one longitudinally extending lower frame member includes a first, second, third, and fourth longitudinally extending lower frame members,
the first longitudinally extending lower frame member being disposed on a first side of a longitudinal centerline of the first watercraft receiving portion,
the second longitudinally extending lower frame member being disposed on a second side of the longitudinal centerline of the first watercraft receiving portion,
the third longitudinally extending lower frame member being disposed on a first side of a longitudinal centerline of the second watercraft receiving portion,
the fourth longitudinally extending lower frame member being disposed on a second side of the longitudinal centerline of the second watercraft receiving portion,
the first walk board being disposed laterally between the second and third longitudinally extending lower frame members.

28. The trailer of claim 27, wherein the lower frame further includes a laterally extending lower frame member connected to the first, second, third, and fourth longitudinally extending lower frame members; and
wherein the first wheel is operatively connected to a first end of the laterally extending lower frame member and the second wheel is operatively connected to a second end of the laterally extending lower frame member.

29. The trailer of claim 27, further comprising a plurality of rollers disposed on the first, second, third, and fourth longitudinally extending lower frame members.

30. The trailer of claim 23, further comprising a releasable connector for releasably connecting a watercraft to the trailer, the releasable connector being disposed on the longitudinal centerline of the watercraft receiving portion on a front portion thereof.

31. The trailer of claim 30, further comprising an actuator disposed adjacent the watercraft receiving portion, the actuator being operatively connected to the releasable connector;
wherein actuation of the actuator causes the releasable connector to release the watercraft from the releasable connector.

32. The trailer of claim 23, wherein upper surfaces of the first walk board and the step are textured.

33. The trailer of claim 23, wherein the first walk board is at least 5 cm wide.

* * * * *